United States Patent
Bellini, III et al.

(10) Patent No.: US 10,897,410 B2
(45) Date of Patent: *Jan. 19, 2021

(54) SYSTEMS AND METHODS FOR MANAGING SERVICE LEVEL AGREEMENTS OF SUPPORT TICKETS USING A CHAT SESSION

(71) Applicant: ConnectWise, LLC, Tampa, FL (US)

(72) Inventors: Arnold Bellini, III, Tampa, FL (US); Linda Brotherton, Tampa, FL (US); Craig M. Fulton, St. Petersburg, FL (US)

(73) Assignee: Connectwise, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/131,954

(22) Filed: Sep. 14, 2018

(65) Prior Publication Data

US 2019/0089605 A1    Mar. 21, 2019

Related U.S. Application Data

(63) Continuation of application No. 14/448,629, filed on Jul. 31, 2014, now Pat. No. 10,079,736.

(51) Int. Cl.
*G06F 15/173* (2006.01)
*H04L 12/24* (2006.01)
(Continued)

(52) U.S. Cl.
CPC ............ *H04L 41/5074* (2013.01); *G06F 9/44* (2013.01); *G06F 11/00* (2013.01); *G06Q 10/20* (2013.01);
(Continued)

(58) Field of Classification Search
CPC ............. H04L 41/5009; H04L 41/5032; H04L 41/0803; H04L 41/5012; H04L 41/5038
(Continued)

(56) References Cited

U.S. PATENT DOCUMENTS 6,177,932 B1    1/2001  Galdes et al.
6,389,132 B1    5/2002  Price
(Continued)

FOREIGN PATENT DOCUMENTS

WO    WO-01/27847 A1    4/2001

OTHER PUBLICATIONS

Bomgar, "ServiceNow Remote Support and Chat Integration", frames from video on company web site, Dec. 8, 2011, 3 pages, Ridgeland, Mississippi.
(Continued)

*Primary Examiner* — Wing F Chan
*Assistant Examiner* — Andrew Woo
(74) *Attorney, Agent, or Firm* — Foley & Lardner LLP

(57) ABSTRACT

Systems and methods of the present disclosure facilitate managing information technology service level agreements. In some embodiments, the system includes a server that accesses a database storing a support ticket in memory. The support ticket can include a creation time and a service level agreement. The service level agreement can include a maximum response time. The server initiates, via the computer network, responsive to input from a computing device, a chat session associated with the computing device and the support ticket. The initiating can be associated with a time stamp. The server can be configured to determine a compliance with the service level agreement. The compliance can be computed as a difference between the time stamp and the creation time being less than the maximum response time. The server can be configured to generate a notification of the compliance with the service level agreement.

14 Claims, 16 Drawing Sheets

(51) Int. Cl.
  *H04L 12/18* (2006.01)
  *G06Q 10/00* (2012.01)
  *G06F 11/00* (2006.01)
  *H04L 12/58* (2006.01)
  *G06F 9/44* (2018.01)

(52) U.S. Cl.
  CPC ...... *H04L 12/1822* (2013.01); *H04L 12/1827* (2013.01); *H04L 51/00* (2013.01)

(58) Field of Classification Search
  USPC .......................................................... 709/223
  See application file for complete search history.

(56) References Cited

U.S. PATENT DOCUMENTS

| | | | |
|---|---|---|---|
| 7,415,417 | B2 | 8/2008 | Boyer et al. |
| 7,472,166 | B1 | 12/2008 | Davis |
| 7,603,625 | B2 | 10/2009 | Guillermo et al. |
| 7,657,605 | B2 | 2/2010 | Blohm |
| 7,787,609 | B1 | 8/2010 | Flockhart et al. |
| 7,933,815 | B2 | 4/2011 | Hutty et al. |
| 7,987,275 | B2* | 7/2011 | Shae .................. H04L 12/1818 709/227 |
| 8,135,612 | B1 | 3/2012 | Scudder |
| 8,332,760 | B2 | 12/2012 | Keohane et al. |
| 8,345,854 | B2 | 1/2013 | Shaffer et al. |
| 8,548,861 | B2 | 10/2013 | Buonanno et al. |
| 8,589,489 | B2 | 11/2013 | Bomgaars et al. |
| 8,595,321 | B2 | 11/2013 | Hoang |
| 8,600,035 | B2 | 12/2013 | Jay et al. |
| 8,666,921 | B2 | 3/2014 | Fisher, Jr. |
| 8,667,059 | B2 | 3/2014 | Singh et al. |
| 2001/0054064 | A1 | 12/2001 | Kannan |
| 2002/0065885 | A1 | 5/2002 | Buonanno et al. |
| 2003/0110228 | A1 | 6/2003 | Xu et al. |
| 2005/0216421 | A1 | 9/2005 | Barry et al. |
| 2006/0248118 | A1 | 11/2006 | Curtis et al. |
| 2007/0094661 | A1 | 4/2007 | Baird et al. |
| 2007/0168446 | A1 | 7/2007 | Keohane et al. |
| 2007/0294368 | A1 | 12/2007 | Bomgaars et al. |
| 2007/0299953 | A1 | 12/2007 | Walker et al. |
| 2008/0104596 | A1 | 5/2008 | Buonanno et al. |
| 2008/0209280 | A1 | 8/2008 | Dilillo et al. |
| 2009/0043669 | A1 | 2/2009 | Hibbets et al. |
| 2009/0063175 | A1 | 3/2009 | Hibbets et al. |
| 2010/0146529 | A1 | 6/2010 | Heath et al. |
| 2010/0223190 | A1 | 9/2010 | Pedersen et al. |
| 2010/0299153 | A1 | 11/2010 | Curtis et al. |
| 2012/0215767 | A1 | 8/2012 | Myer et al. |
| 2012/0254381 | A1 | 10/2012 | Rodrigues |
| 2012/0323623 | A1 | 12/2012 | Sabharwal |
| 2013/0018803 | A1 | 1/2013 | Challu |
| 2013/0031481 | A1 | 1/2013 | Schreifels |
| 2013/0055113 | A1 | 2/2013 | Chazin et al. |
| 2013/0204650 | A1* | 8/2013 | Sabharwal ............. G06Q 10/10 705/7.13 |
| 2013/0282725 | A1 | 10/2013 | Rubinger |
| 2013/0332537 | A1 | 12/2013 | Emerick et al. |
| 2014/0032254 | A1* | 1/2014 | Della Corte ......... G06Q 30/016 705/7.14 |
| 2014/0040397 | A1 | 2/2014 | Bomgaars et al. |
| 2014/0081875 | A1 | 3/2014 | Pierson et al. |

OTHER PUBLICATIONS

Bomgar, "ServiceNow Remote Support and Chat Integration", from company web site, captured Jun. 21, 2014, 3 pages, Ridgeland, Mississippi.
Buecker et al, "IT Service Management Best Practices Using IBM SmartCloud Control Desk", First Edition, Dec. 2013, 4 pages, IBM Redbooks, Armonk, New York.
Citrix, "Citrix GoToAssist Delivers "One-Stop Shop" for IT Support", press release from company web site, Oct. 17, 2012, 3 pages, Santa Clara, California.
Citrix, "Introducing GoToAssist Service Desk", frames from YouTube video, Oct. 17, 2012, 4 pages, Santa Clara, California.
Dameware, "Chat with End-Users & Capture Remote Screenshots", excerpt from company web site, captured Jun. 22, 2014, 1 page, Austin, Texas.
DeskDirector, "Watch a Demo", frames from video on company web site, Dec. 11, 2013, 4 pages, Auckland, New Zealand.
DeskDirector, Chat With Your Clients, product description from company web site, captured Jul. 13, 2014, Auckland, New Zealand, 4 pages.
Final Office Action on U.S. Appl. No. 14/448,629 dated Jun. 4, 2015 (13 pages).
GFI MAX, "Remote Command Line—GFI MAX RemoteManagement—[Product Series]", frames from YouTube video, Sep. 6, 2013, 4 pages, Durham, North Carolina.
Interview Summary on U.S. Appl. No. 14/448,629 dated Mar. 9, 2016 (2 pages).
Kaseya, "Asset management—Remote Control", page from company web site, captured Jun. 22, 2014, 4 pages, Jersey, British Isles.
Kaseya, "Live Connect Video Char", image from company web site, captured Jun. 22, 2014, 1 page, Jersey, British Isles.
LogMeIn, "About Instant Chat", page from company web site, web page dated 2013, captured Jun. 22, 2014, 1 page Boston, Massachusetts.
LogMeIn, "Integration of Rescue and Zendesk", page from company web site, web page dated 2013, captured Jun. 22, 2014, 1 page, Boston, Massachusetts.
ManageEngine, "Live Chat in ServiceDesk Plus On Demand", online documenation site, captured Jul. 13, 2014, 11 pages, Pleasanton, California.
ManageEngine, "New Feature—Live Chat Integration", page from company web site, Feb. 5, 2014, 1 page, Pleasanton, California.
Mason, Jeff, "Deep Integration" & The Meaning of "Great", blog entry on Velaro company web site, May 20, 2014, 6 pages, Elkridge, Maryland.
Microsoft Corporation, "Microsoft System Center—Remote Tools", online product documentation, captured Jun. 21, 2014, 5 pages, Redmond, Washington.
N-able, a SolarWinds company, What's New in N-central 8.0, frames from YouTube video, Apr. 29, 2011, Ottawa, Ontario, Canada, 1 page.
Non-Final Office Action on U.S. Appl. No. 14/448,629 dated Feb. 16, 2016 (13 pages).
Non-Final Office Action on U.S. Appl. No. 14/448,629 dated Nov. 2, 2016 (18 pages).
Non-Final Office Action on U.S. Appl. No. 14/448,629 dated Oct. 19, 2017 (29 pages).
Non-Final Office Action on U.S. Appl. No. 14/448,629 dated Oct. 22, 2014 (10 pages).
NTRglobal, "ConnectWise Rolls out Chat, Remote Control for enhanced help desk support and service ticketing", press release from company web site, undated, captured Jun. 22, 2014, 2 pages, Barcelona, Spain.
NTRglobal, "NTR Chat", product description from company web site, web page dated 2012, captured Jun. 21, 2014, 2 pages, Barcelona, Spain.
NTRglobal, "Partners—ConnectWise integration", frames from video on company web site, web page dated 2012, captured Jun. 22, 2014, 3 pages, Barcelona, Spain.
RealVNC, "VNC User Guide", Version 5.2, Jun. 2014, 4 pages, Cambridge, United Kingdom.
Rodriguez Puertas, Alexandre, Tne introduction of a ticket system for a professional business to business support center, Master's thesis, Universitat Politecnica de Catalunya, Jun. 6, 2011, Barcelona, Spain, 122 pages.
ServiceNow, "Chat", online product documentation, Feb. 13, 2014, 5 pages, Santa Clara, California.
ServiceNow, "Using Chat", online product documentation, Jun. 11, 2014, 12 pages, Santa Clara, California.

(56) References Cited

OTHER PUBLICATIONS

ServiceNow, "Using Help Desk Chat", online product documentation, Oct. 15, 2012, 4 pages, Santa Clara, California.
Shae et al, "Efficient Internet Chat Services for Help Desk Agents", 2007 IEEE International Conference on Services Computing, Jul. 9, 2007, 8 pages, New York, New York.
SysAid, "Live Chat", page from company web site, captured Jun. 22, 2014, 2 pages, Airport City, Israel.
SysAid, "Ticket Management", page from company web site, captured Jun. 22, 2014, 6 pages, Airport City, Israel.
SysAid, Service Desk, images from online product documentation, Mar. 23, 2014, Airport City, Israel, 1 page.
TeamViewer GMBH, "TeamViewer 9 Manual—Remote Control", Rev 9.1-12/2013, Dec. 2013, 84 pages, Goppingen, Germany.
UltraVNC, "UltraVnc Chat", page from organization web site, captured Jun. 21, 2014, 1 page, Bergschenhoek, Netherlands.
U.S. Notice of Allowance on U.S. Appl. No. 14/448,629 dated May 23, 2018 (15 pages).
Yan, "Setting up and using Zendesk with LogMeIn Rescue", blog entry on Zendesk company web site, Sep. 13, 2010, 5 pages, San Francisco, California.

\* cited by examiner

| Contact | Time | SLA | Summary | Compliant | |
|---|---|---|---|---|---|
| Alice Jones | 09:37 AM | 90 min | Mouse pad on fire | open | Chat |
| Bob Smith | 10:03 AM | 30 min | Cell phone leaks oil | OK | Chat |

SYSTEMS AND METHODS FOR MANAGING SERVICE LEVEL AGREEMENTS OF SUPPORT TICKETS USING A CHAT SESSION

CROSS-REFERENCES TO RELATED APPLICATIONS

This application claims the benefit of priority under 35 U.S.C. § 120 as a continuation of U.S. patent application Ser. No. 14/448,629, filed Jul. 31, 2014, which is hereby incorporated by reference herein in its entirety.

FIELD OF THE DISCLOSURE

The present disclosure generally relates to customer support tickets. More specifically, the present disclosure relates to service level agreements of customer support tickets and initiating a chat session.

BACKGROUND OF THE INVENTION

Customers of information technology services may encounter problems related to an information technology service or product, or make requests for a service or product. Customers may contact a provider of the information technology services to address the problems or requests. The provider may create support tickets to organize and facilitate addressing the customers' problems and requests. The provider may provide service level agreements with guaranteed response times to satisfy the requirements of customers. As providers of information technology services receive numerous requests from various customers, it may be challenging to monitor, comply with, and audit the service level agreements.

SUMMARY OF THE INVENTION

A company may want to provide customer support to customers to facilitate resolving problems. These problems may involve any aspect of the business of the customer. For example, a customer may want help to fix a hardware failure, or help to use a software application, or help to configure a software service, or help to understand an invoice, or even help to track down a missing shipment. The company may choose to use a software application designed for customer support to facilitate the support process. The customer support application may be a ticketing system. In a ticketing system, an end user can enter a request for help. The request can be stored in a support ticket, and the support ticket can be used to track the status of the help request until it is solved.

The company may commit to a service level agreement (SLA). The SLA may guarantee a maximum time to respond to an incident, and may also guarantee a different maximum time to resolve an incident. For example, one SLA could specify a maximum of 30 minutes to respond to an incident, and a maximum of 24 hours to resolve an incident. A second SLA may instead specify a maximum of 4 hours to respond to an incident, and a maximum of 48 hours to resolve an incident. The company may have to pay a penalty for every incident where the SLA is not met. The company may be able to charge different prices for the same customer support service depending on the SLA that is provided.

The ticketing system may support chat connections between the support technicians and end users. Chat sessions can facilitate improving the efficiency of technicians, and reducing frustration by end users, by reducing the delay introduced by waiting for messages, when using email for communication, or playing "phone tag" or waiting on hold, when using the phone for communication. Chat sessions may also facilitate improving the efficiency of technicians by allowing technicians to interact with more than one end user at the same time. In particular, a technician can continue to help other end users while waiting for one end user to perform an action. Similarly, an end user may prefer chat sessions for communicating with technicians, because using a chat session may facilitate the end user to continue other work while also proceeding with the support task. End user satisfaction may also be increased by the fact that the same number of technicians may be able to service a larger number of end users at the same time, which may reduce the average wait times for all end users.

Measuring compliance with SLAs can be important for the company, since SLA compliance can affect the revenue of the company, and can also be directly related to customer satisfaction. It may help the company to have direct measurement of SLA compliance in order to do accurate billing. It may benefit the company to also have auditing of SLA compliance in order to resolve customer disputes about the billing. The company may also want to have alerts when SLAs are approaching non-compliance, in order to be able to allocate resources properly to avoid the non-compliance.

SLA compliance may be measured by the ticketing system, by recording the times when a support ticket is created, when a technician proposes a method for solving the issue, when the support ticket is first addressed by a technician, and when the support ticket is closed. The creation time for a support ticket may be well established, since the ticketing system may be able to record it accurately when the support ticket is first entered. However, it may be more difficult to accurately establish the response time and the resolution time, and in particular, it may be more difficult to properly audit these times in order to resolve customer disputes about billing. For example, a customer may assert that a technician accepted a support ticket in order to avoid SLA non-compliance, but did not actually start working on the support ticket at that time. In another example, a customer may assert that a technician closed a support ticket when the issue was not actually resolved, in order to avoid SLA non-compliance. In yet another example, a technician may forget to close a support ticket when the issue is resolved, creating an apparent SLA non-compliance when none actually exists.

Systems and methods of the present disclosure for integrating chat sessions with a ticketing system can facilitate setting the response time for a support ticket when a technician starts chatting with the end user, and setting the resolution time for the support ticket when the chat session is closed. The contents of the chat session can also be saved as a transcript with the support ticket, which can provide audit information demonstrating that the customer accepted the issue as being resolved. The present disclosure describes methods and systems for integrating a chat system into a ticketing system to provide SLA compliance information.

At least one aspect of the present disclosure is directed to a system for managing information technology service level agreements. In some embodiments, the system includes a computer network and a server. The server can be configured to access a database that stores a support ticket in memory. The support ticket can include a creation time and a service level agreement. The service level agreement can include a maximum response time. The server can be configured to initiate, via the computer network, responsive to input from a computing device, a chat session associated with the computing device and the support ticket. The initiating can be associated with a time stamp. The server can be configured to determine a compliance with the service level agreement. The compliance can be computed as a difference between the time stamp and the creation time being less than the maximum response time. The server can be configured to generate a notification of the compliance with the service level agreement.

In some embodiments, the service level further includes a maximum resolution time. The server can be further configured to terminate, via the computer network, responsive to input from a second computing device, the chat session. The terminating can be associated with a second time stamp. The server can be configured to determine a second compliance with the service level agreement. The second compliance can be computed as the difference between the second time stamp and the time stamp being less than the maximum resolution time. The server can be configured to generate a second notification of the second compliance with the service level agreement.

In some embodiments, the support ticket further comprises a status. The server can be further configured to modify, responsive to the terminating, the status to indicate a closed status.

In some embodiments, the server can be further configured to initiate, via the computer network, responsive to input from a second computing device, a second chat session associated with the second computing device and the support ticket. The initiating can be associated with a second time stamp. The server can be further configured to modify, responsive to the initiating of the second chat session, the status to indicate an open status, and the creation time to be the second time stamp.

In some embodiments, the service level agreement further comprises a maximum resolution time. The support ticket can further comprise a status. The server can be further configured to modify, responsive to input from a second computing device, the status to indicate a closed status, The modifying can be associated with a second time stamp. The server can be further configured to determine a second compliance with the service level agreement. The second compliance can be computed as the difference between the second time stamp and the time stamp being less than the maximum resolution time. The server can be further configured to generate a second notification of the second compliance with the service level agreement.

In some embodiments, the support ticket further comprises a status. The server can be further configured to modify, responsive to input from a second computing device, the status to indicate a closed status. The server can be further configured to terminate, via the computer network, responsive to the modifying, the chat session.

In some embodiments, the server can be further configured to initiate, via the computer network, responsive to input from a second computing device, a second chat session associated with the second computing device. The second initiating can be associated with a second time stamp. The server can be further configured to create a second support ticket comprising a second creation time. The second creation time can be equal to the second time stamp.

In some embodiments, the server can be further configured to receive, from a clock, a current time as a second time stamp. The server can be further configured to determine a warning of the service level agreement. The warning can be computed as the difference between the second time stamp and the creation time can be more than a threshold percentage of the maximum response time. The server can be further configured to generate a notification of the warning of the service level agreement.

At least one aspect of the present disclosure is directed to a method for managing information technology service level agreements via a computer network. The method can include a server accessing a database that stores a support ticket in memory. The support ticket can include a creation time and a service level agreement. The service level agreement can include a maximum response time. The method can include the server initiating, via the computer network, responsive to input from a computing device, a chat session associated with the computing device and the support ticket. The initiating can be associated with a time stamp. The method can include the server determining a compliance with the service level agreement. The compliance can be computed as a difference between the time stamp and the creation time being less than the maximum response time. The method can include the server generating a notification of the compliance with the service level agreement.

At least one aspect of the present disclosure is directed to a non-transitory computer readable medium storing instructions that, when executed by one or more processors, facilitate managing information technology service level agreements via a computer network. The instructions can include instructions to access a database that stores a support ticket in memory. The support ticket can include a creation time and a service level agreement. The service level agreement can include a maximum response time. The instructions can include instructions to initiate, via the computer network, responsive to input from a computing device, a chat session associated with the computing device and the support ticket. The initiating can be associated with a time stamp. The instructions can include instructions to determine a compliance with the service level agreement. The compliance can be computed as a difference between the time stamp and the creation time being less than the maximum response time. The instructions can include instructions to generate a notification of the compliance with the service level agreement.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 3A is an illustrative example of an embodiment of a user interface for a service board to facilitate a support agent using chat sessions to manage service level agreements of support tickets.

Like reference numbers and designations in the various drawings indicate like elements.

DETAILED DESCRIPTION

Figure 1:
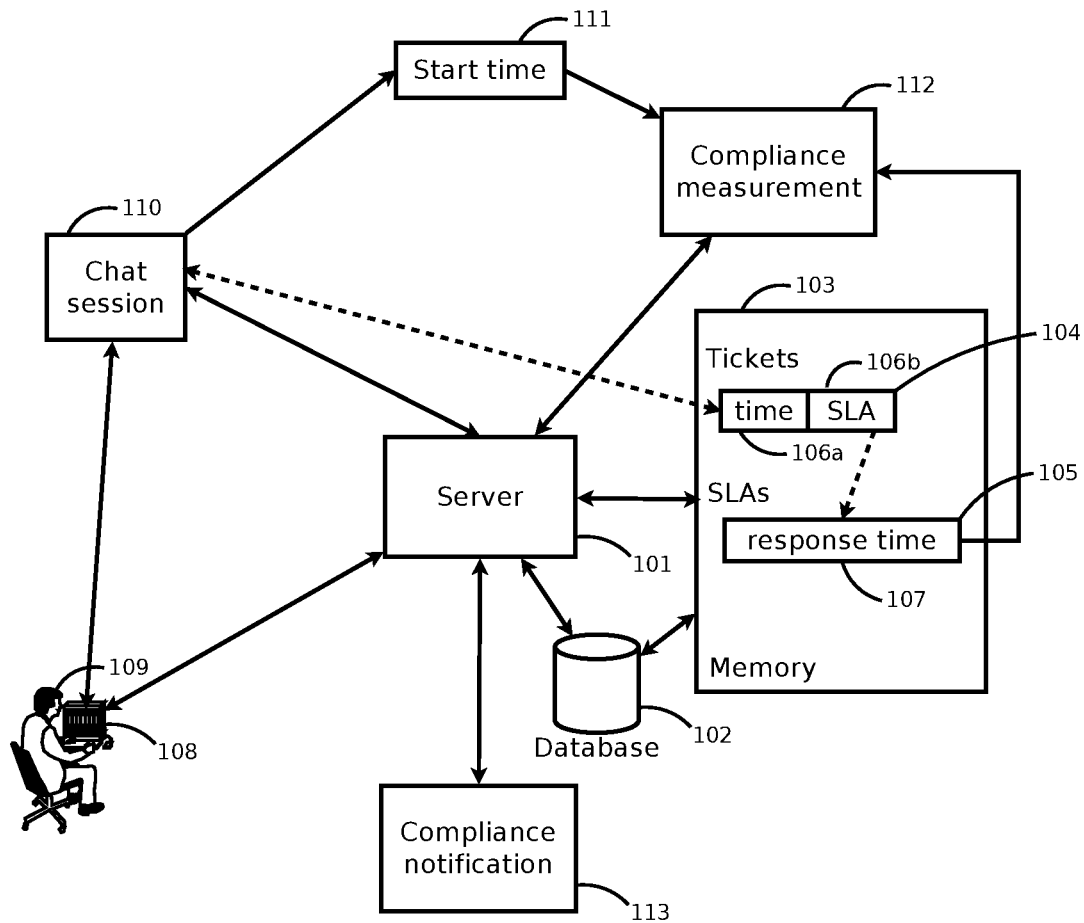
FIG. 1 is an illustrative block diagram of an embodiment of a system for managing service level agreements of support tickets using a chat session.

Systems and methods of the present disclosure can facilitate managing information technology service level agreements. The system can include a server, which can provide a ticketing system with service level agreements. Support agents and customers can use computing devices to access the ticketing system and service level agreements. The ticketing system can use a database to store support tickets and information about them. The system can include a computer network, which can serve to connect the server and the computing devices, as well as other components in the system. The server can measure compliance with the service level agreements in the ticketing system. The server can start chat sessions associated with the computing devices and support tickets. The server can generate notifications based on compliance with the service level agreements. The server can generate user interfaces for display on the computing devices.

The ticketing system can be used to manage support incidents by associating a support ticket with each support incident. A support ticket can be created when a support incident is reported. For example, a support agent can create a support ticket in response to a phone call from a customer reporting a problem. In another example, a customer can create a support ticket in order to report a support incident. Support incidents may involve one or more aspect of the business of the customer. For example, a customer may want help to fix a hardware failure, or help to use a software application, or help to configure a software service, or help to understand an invoice, or even help to track down a missing shipment.

The support ticket can store multiple fields of information about the support incident. For example, the support ticket can store the company name for the customer, the contact name for the customer, the phone number for the customer, the email address for the customer, a site name for the customer, the address for the customer, the service agreement for the customer, a sales opportunity being pursued, the deadline for the support ticket, the service level agreement (SLA) for the support ticket, the support ticket status, the class of service applied to the support ticket, the way the support ticket was originally entered, the person who originally entered the support ticket, the severity of the support ticket, the impact of the support ticket, the time budgeted for the support ticket, a summary of the issue, a detailed description of the issue, the history of the support ticket so far, internal notes about the support ticket, the account manager for the customer, the time and date the support ticket was originally entered, the time and date the support ticket had a first response, the time and date the support ticket had a proposed solution accepted, the time and date the support ticket was resolved, the time and date the support ticket was closed, the time and date the support ticket was reopened, or other information related to the support incident.

The support ticket can store a ticket status. This can help to manage the life cycle of the support ticket. For example, when the support ticket is first created, it can have a ticket status of "new". When the support agent starts working on the support incident described by the support ticket, the status can be changed to "processing". If the support agent asks the customer for more information, or asks the customer to make a change, the ticket status can be changed to "waiting". When the support incident is resolved, the ticket status can be changed to "closed". If it is discovered that the support incident has not been fully resolved, the ticket status can be changed to "reopened". In this way, the ticket status can be used to facilitate routing the support ticket to the attention of the right individual, and can also be used to track the progress of the solution of the support incident.

Service boards can be used to manage groups of support tickets. A service board can show a group of support tickets, showing a summary of each support ticket in the group. The support tickets on a service board can be selected, ordered, and segmented based on the fields in the support tickets. For example, one service board can select one, some or all support tickets with a ticket status of "new", order the support tickets by the support ticket creation time, oldest first, and segment the support tickets by the class of service the customer has purchased. In this way, this service board can be used to monitor new support issues from the most important customers, and help to address the ones first that have been outstanding the longest time. In another example, a service board can select one, some or all support tickets that are assigned to a certain support agent and order them by the priority that has been assigned to the support ticket. In this way, the support agent can use this service board to quickly decide on which support ticket (and which support issue) to work on next.

The server may facilitate the creation of a chat session between a support agent and a customer. The support agent can be an individual who is using a computing device to work with a customer to help address the support issue. In a chat session, a separate window can be created on the computing devices of the support agent and the customer.

The separate window can allow both participants to type messages to each other, and can display a record of the messages over time. The chat agent may also facilitate the creation of a remote control session, in which the support agent can monitor the outputs of the computing device of the customer, such as the screen and the audio output, and can temporarily take control of the input devices on the computing device of the customer, such as a mouse and keyboard. In this way, the support agent may be able to work on the support incident more efficiently.

The server may allow the customer to sign in using authentication credentials such as a user name and password. In this way, the server may be able to display a service board, on a computing device, to the customer. The customer service board can be configured to show the support tickets associated with the customer, which may allow the customer to check on the status of the support tickets or update the support tickets as desired.

The service boards may be configured to start a chat session associated with a support ticket on the service board. Both the service boards used by the support agent and the service board shown to the customer can be configured to start chat sessions in this way. When a service board is used to start a chat session, the chat session can display the chat transcript along with the support ticket, and can facilitate updating the support ticket during the duration of the chat session. This may facilitate the resolution of support incidents that require attention over a longer period of time, or that require attention by more than one support agent, by making information about the support incident more easily available.

Using chat sessions to support customers may facilitate the efficiency of a support agent by allowing the support agent to work with more than one customer at the same time. For example, if the support agent is resolving a billing issue with one customer that requires the customer to verify a copy of an invoice, then the support agent can work with another customer on a software installation issue while the first customer goes to find the invoice. The support management may wish to set a limit on the maximum number of simultaneous chat sessions that a support agent will have, in order to prevent a degradation of the quality of the service seen by customers. For example, the management may set a limit of three chat sessions for one support agent. The system can then prevent additional chat sessions from being opened with that support agent once the limit of three has been reached.

A chat session may include more participants than one support agent and one customer. For example, a first support agent may discover that the support incident involves specialized knowledge that would be better addressed by a second support agent who is a local expert in that specialized knowledge. The first support agent may decide to bring the second support agent into the support incident, and may add the second support agent to the chat session, which can now be associated with the customer, the first support agent, and the second support agent. The chat session may support all three participants seeing every message. The chat session may also support private messages between the first support agent and the second support agent, so that the customer does not see these messages. The chat session may support the first support agent turning the support ticket over to the second support agent, so that the support ticket is updated to show that the second support agent is managing the support ticket, and the first support agent is leaving the chat session. It should be understood that the chat session can support multiple support agents and multiple customers as needed in order to address the support incident.

The ticketing system may display support information about the support incident in addition to the information that is included in the support ticket. For example, the company may have a monitoring system in place that records information about the computing devices and their activity. The ticketing system may be able to access the monitoring information about the computing device associated with the support ticket, and may be able to display that monitoring information along with the support ticket.

The ticketing system can use queues to facilitate support agents in addressing support incidents. The queues can be given names that generally correspond with a class of support incident, for example, a queue may have the name "billing", indicating that it is intended for billing questions and issues, and another queue may have the name "hardware", indicating that it is intended for issues with hardware components such as machines, networking equipment, and displays. A queue can be associated with a service board, which may indicate that creating a support ticket associated with the queue will also associate it with the service board, which can cause it to be displayed on the service board. A support agent can be associated with one or more queues, which may indicate that the support agent is available to work on support tickets associated with those queues.

The ticketing system can have workflow rules that can automate support ticket processing. A workflow rule can have a set of criteria to select a set of support tickets, and can have a set of actions to take on the selected support tickets. For example, a workflow rule can select support tickets that have had the "new" status for longer than one hour, and the action can be to change the service board associated with the support ticket to a "late" service board and send an alert email to a set of service managers. The service managers may monitor the "late" service board and allocate resources as needed to help ensure that the company responds to customer requests in a timely way.

Support tickets may be associated with a service level agreement (SLA). Customers may be associated with an SLA. An SLA can include a name, a response priority matrix, and service level targets (SLTs). Each support ticket can have a severity level associated with it. The severity level can indicate how widespread a support issue is. For example, the severity level can have a value of "low" indicating that one user or a small group of users are affected by the support issue, a value of "medium" indicating that a whole department or a large group of users are affected by the support issue, and a value of "high" indicating that the whole company is affected by the support issue. Each support ticket can have an impact level associated with it. The impact level can indicate how important the support issue is. For example, the impact level can have a value of "low" indicating that the support issue is irritating but does not prevent work, a value of "medium" indicating that the support issue interferes with work but has a reasonable workaround, and a value of "high" indicating that the support issue prevents work from proceeding. The response priority matrix in an SLA can map combinations of severity and impact values to priorities. For example, the combination of "high" severity and "high" impact may map to a priority of "critical", which may be the highest priority, because it can represent a support issue that affects the whole company and prevents work from proceeding. Each priority can have a service level target (SLT) associated with it. An SLT can include a service schedule, a response goal for "initial response", a response goal for "resolution plan", and a response goal for "resolution". The service schedule can indicate the times during which the SLT applies. For example, a service schedule can indicate service during normal business hours, and a different service schedule can indicate service at some or all times (24×7). Each response goal can include a time period and a percentage. The response goal can indicate that the support team will accomplish the activity within the time period at least as often as indicated by the percentage. For example, if a response goal indicates a time period of 1 hour and 90%, the service level agreement will be satisfied if the support team completes the activity within 1 hour at least 90% of the time. The response goal for "initial response" can indicate the goal for contacting the customer after the support ticket is created. The response goal for "resolution plan" can indicate the goal for having a written plan of action for resolving the support issue after the support ticket is created. The response goal for "resolution" can indicate the goal for resolving the support issue after the support ticket is created. For example, a "critical" priority may have an SLT with a 24-hour schedule, an "initial response" goal of 2 hours at 80%, a "resolution plan" goal of 8 hours at 80%, and a "resolution" goal of 16 hours at 90%.

The service provider may use SLAs to provide different products. For example, a service provider can provide the same service to two different customers and charge more to one of the customers because the SLA indicates a higher service level, with a longer schedule, shorter response goal times, or higher response goal percentages. The customers may then require measurement of the performance of the service provider against the SLA. For example, if the SLA requires an initial response of 2 hours at 80%, the service provider may show that for some or all the support tickets covered by that SLA, at least 80% of the support tickets had an initial response in 2 hours or less. If fewer than 80% of the support tickets covered by the SLA had an initial response in 2 hours or less, the service provider may not be in compliance with the SLA, and may be required to offer compensation to the customer. In order to correctly measure SLA compliance, it may be necessary to have accurate times associated with the support ticket for the initial creation time, the time of the first response, the time when the resolution plan is presented to the customer, and the time when the support issue is resolved.

The server can generate notifications based on the SLA compliance. For example, if a support ticket becomes non-compliant with an SLA, the server can generate an alert for a service manager that the support ticket needs special attention. This alert may be communicated by email, text message, chat session, voice phone call, pop-up message, or other communication channel. This alert may also update a display of the SLA compliance status in a user interface.

The server can generate warnings based on SLA compliance. These warnings may facilitate avoiding a support ticket becoming non-compliant with an SLA, by allowing action to be taken to prevent the non-compliance. The server can generate a warning when the parameters governing SLA non-compliance come within a certain threshold or percentage threshold of the non-compliance level. This warning may be communicated by email, text message, chat session, voice phone call, pop-up message, or other communication channel. This warning may also update a display of the SLA compliance status in a user interface.

A chat session may facilitate providing accurate times for measuring SLA compliance. In an illustrative example, a customer may create a support ticket by opening a chat session with a support agent. The creation time of the support ticket can be recorded as the time when the chat session was opened. The initial response time of the support ticket can be recorded as the time when the customer receives the first chat response from a support agent. The user interface for the chat session can provide a selectable control indicating that a proposed solution for the support issue has been accepted, and the resolution plan time of the support ticket can be recorded as the time when this control is selected. The user interface for the chat session can provide a selectable control indicating that the support issue has been resolved, and the resolution time of the support ticket can be recorded as the time when this control is selected. The resolution time of the support ticket may also be recorded as the time when the chat session is terminated. The SLA compliance status of the support ticket can be computed based on the recorded times and can be displayed in a user interface.

In another illustrative example, a customer may create a support ticket using an online form, or by calling a dispatch agent on the phone, who may enter a support ticket into the ticketing system. The creation time of the support ticket can be recorded as the time when the support ticket was first entered, either by the customer or by the dispatch agent. Later, a support agent may open a chat session with the customer based on the support ticket. The initial response time of the support ticket can be recorded as the time when the chat session is opened. The user interface for the chat session can provide a selectable control indicating that a proposed solution for the support issue has been accepted, and the resolution plan time of the support ticket can be recorded as the time when this control is selected. The user interface for the chat session can provide a selectable control indicating that the support issue has been resolved, and the resolution time of the support ticket can be recorded as the time when this control is selected. The resolution time of the support ticket may also be recorded as the time when the chat session is terminated. The SLA compliance status of the support ticket can be computed based on the recorded times and can be displayed in a user interface.

After a support ticket has been closed, a customer may discover that the same problem happens again, or the original problem recurs. It may be desirable to use the same support ticket for this second or continuation support incident. For example, it may save effort by eliminating or reducing or substantially reducing the need for the customer to enter data again, or it may facilitate using the same resolution for the problem or modifying the resolution. It may be possible to change the status of the support ticket from a "closed" status to a "reopened" status to indicate that the same issue needs to be addressed. The ticketing system can set the creation time of the support ticket to the time at which this status change is made, and SLA compliance tracking can also be restarted on the support ticket.

Turning to the figures, FIG. 1 is an illustrative block diagram of an embodiment of a system for managing service level agreements of support tickets using a chat session. The server 101 can access a database 102 and retrieve, into memory 103, a support ticket 104 and a service level agreement (SLA) 105. The support ticket 104 can include a creation time 106*a* and a reference 106*b* to an SLA. In the embodiment depicted in FIG. 1, the reference 106*b* is associated with the SLA 105. The SLA 105 can include a maximum response time 107. A support agent 109 can use a computing device 108 to interact with the server 101 to start a chat session 110. The chat session 110 can be associated with the support ticket 104. The chat session 110 can record the time stamp 111 at which the support agent 109 creates the first chat comment. A compliance measurement 112 can compute the elapsed time between the creation time 106a of the support ticket 104 and the time stamp 111 of the first response of the support agent 109, and compare it to the maximum response time 107 of the SLA 105. If the elapsed time is greater than the maximum response time 107, the compliance measurement 112 can determine that the support ticket 104 is not in compliance with the SLA 105; otherwise the compliance measurement 112 can determine that the support ticket 104 is in compliance with the SLA 105. The compliance measurement 112 can transmit this determination to the server 101. The server 101 may generate a notification 113 about the SLA compliance, based on this determination.

The one or more servers 101 associated with the system may not be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node. In one embodiment, the server may be referred to as a cloud.

The server 101, database 102, memory 103, computing device 108, compliance measurement 112, and compliance notification 113 may be connected to a network. The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include one or more of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

The system and its components, such as a server 101, database 102, memory 103, computing device 108, compliance measurement 112, compliance notification 113, and chat session 110 may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

The system and its components, such as a server 101, database 102, memory 103, computing device 108, compliance measurement 112, compliance notification 113, and chat session 110 may include, e.g., computing devices, desktop computers, laptop computers, notebook computers, mobile or portable computing devices, tablet computers, smartphones, personal digital assistants, or other computing device.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 2:
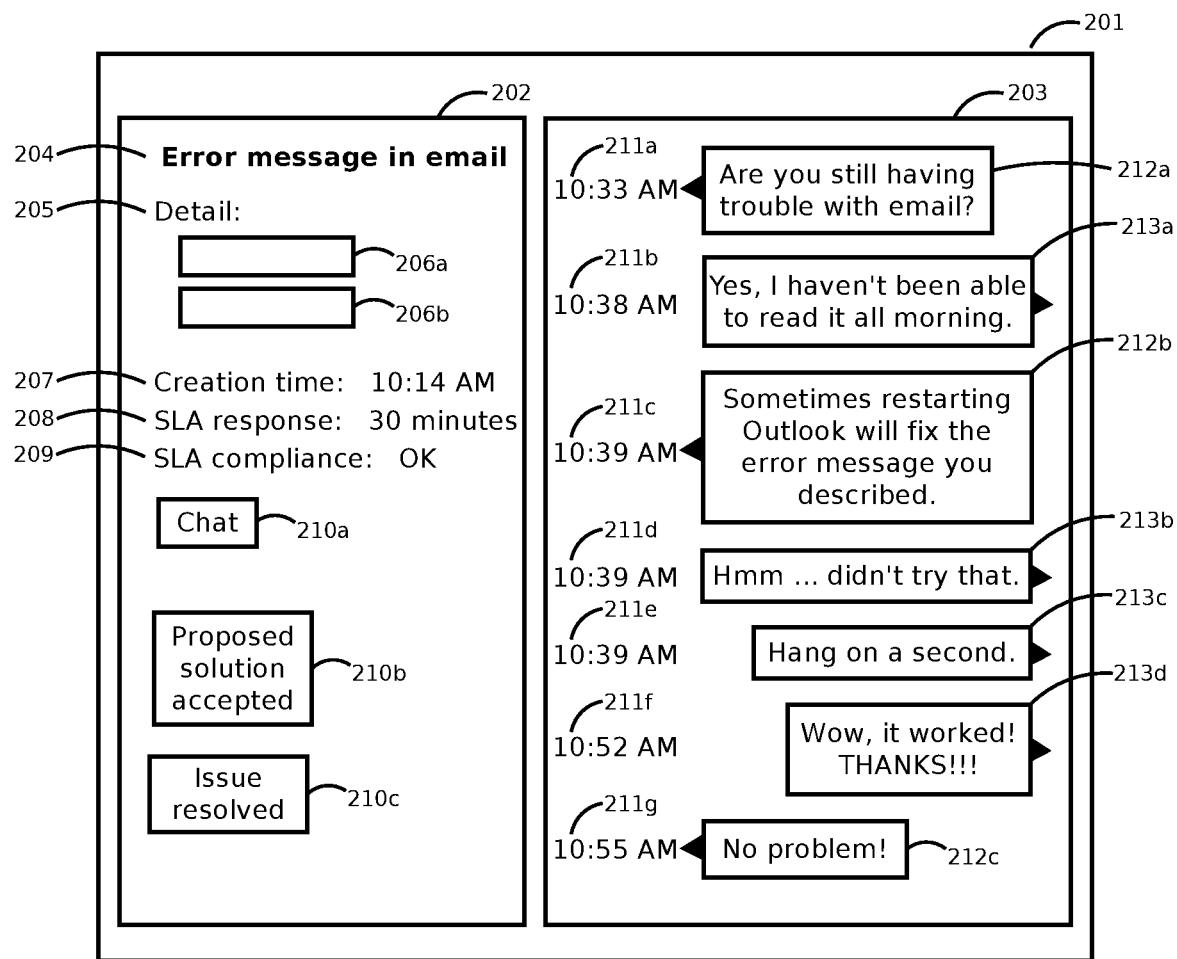
FIG. 2 is an illustrative example of an embodiment of a user interface for using a chat session to manage a service level agreement of a support ticket.

FIG. 2 is an illustrative example of an embodiment of a user interface for using a chat session to manage a service level agreement of a support ticket. The user interface 201 can include a section 202 with information about the support ticket and a section 203 with information about the chat session. Section 202 can include a summary 204 of the support ticket, a label 205 for detail about the support ticket, additional detail about the support ticket 206a, 206b, and so on, a display 207 of the creation time of the support ticket, a display 208 of the maximum response time in the SLA associated with the ticket, and a display 209 indicating whether the support ticket is in compliance with the SLA. It should be noted that FIG. 2 is indicative of the display of details of the support ticket 206a, 206b, and so on, but does not show a full representation; the composition and display of such a representation is known to one skilled in the art.

Section 203 can include a record of the interaction between the support agent and the customer. This can include messages 212a-c created by the support agent, messages 213a-d created by the customer, and time stamps 211a-g indicating when each message was created.

Section 202 can also include a control 210a to start a chat session associated with the ticket displayed in section 202, a control 210b that can be selected to indicate that the customer has accepted a proposed solution to the support issue, and a control 210c that can be selected to indicate that the customer has agreed that the support issue has been resolved. By way of example, the support agent may select control 210b after seeing the customer response 213b, and the server may record the time stamp 211d associated with message 213b as the resolution plan time for the support ticket. Also by way of example, the customer may select control 210c after creating the message 213d, and the server may record the time stamp 211f associated with message 213d as the resolution time for the support ticket. Using the time stamps 211a-g instead of recording the time when the controls 210b-c were selected may provide a more accurate measurement of when the related events actually happened.

In the embodiment depicted in FIG. 2, the support ticket was created at 10:14 AM as shown by the creation time 207. The first response by the support agent was at 10:33 AM as shown by the time stamp 211a associated with the first chat message 212a. The elapsed time to the first response is 19 minutes, which is less than the maximum response time 208 of 30 minutes, so the support ticket is in compliance with the SLA, as shown by the compliance indication 209.

It should be noted that the user interface 201 can be used by both a support agent and a customer. There can also be different embodiments of the user interface 201 for use by a support agent and a customer. For example, it may be desirable to have a simpler interface for a customer that omits elements 207, 208, and 209.

FIG. 3A is an illustrative example of an embodiment of a user interface for a service board to facilitate a support agent using chat sessions to manage service level agreements of support tickets. The user interface 301 can include a table 302 with each row 304a, 304b, and so on representing a support ticket that is associated with the support agent. The table 302 can have column headers 303 to indicate the values in the columns 305a-f. Each row can have a column 305a that displays the name of the customer associated with the support ticket, a column 305b that displays the creation time of the support ticket, a column 305c that displays the maximum response time of the SLA associated with the support ticket, a column 305d that displays a descriptive summary of the support ticket, a column 305e that displays the current SLA compliance status of the support ticket, and a column 305f with a selectable control that can be used by the support agent to start a chat session associated with the support ticket.

Figure 3B:
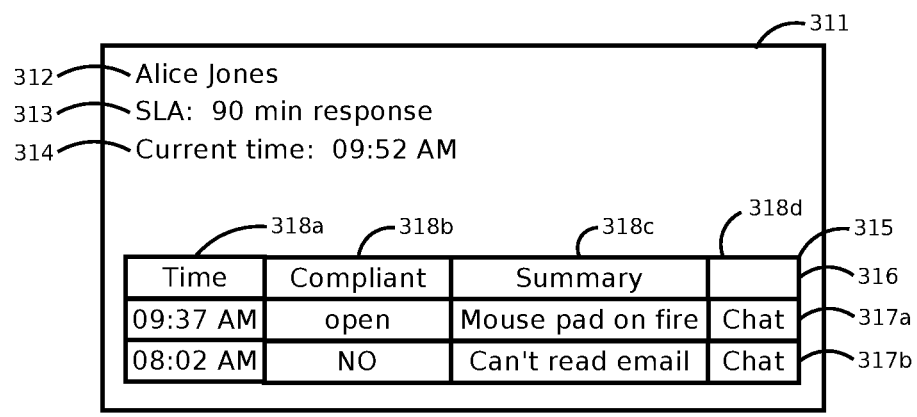
FIG. 3B is an illustrative example of an embodiment of a user interface for a customer to use chat sessions to manage support tickets and also facilitate managing the service level agreements of those support tickets.

FIG. 3B is an illustrative example of an embodiment of a user interface for a customer to use chat sessions to manage support tickets and also facilitate managing the service level agreements of those support tickets. The user interface 311 can include a display 312 of the name of the customer, a display 313 of the default maximum resolution time for SLAs associated with support tickets created by the customer, a display 314 of the current time used for managing SLAs, and a table 315 of open support tickets that are associated with the customer. Each row 317a, 317b, and so on in the table 315 can represent a support ticket that is associated with the customer. The table 315 can have column headers 316 to indicate the values in the columns 318a-d. Each row can have a column 318a that displays the creation time of the support ticket, a column 318b that displays the current SLA compliance status of the support ticket, a column 318c that displays a descriptive summary of the support ticket, and a column 318d with a selectable control that can be used by the customer to start a chat session associated with the support ticket.

Figure 4:
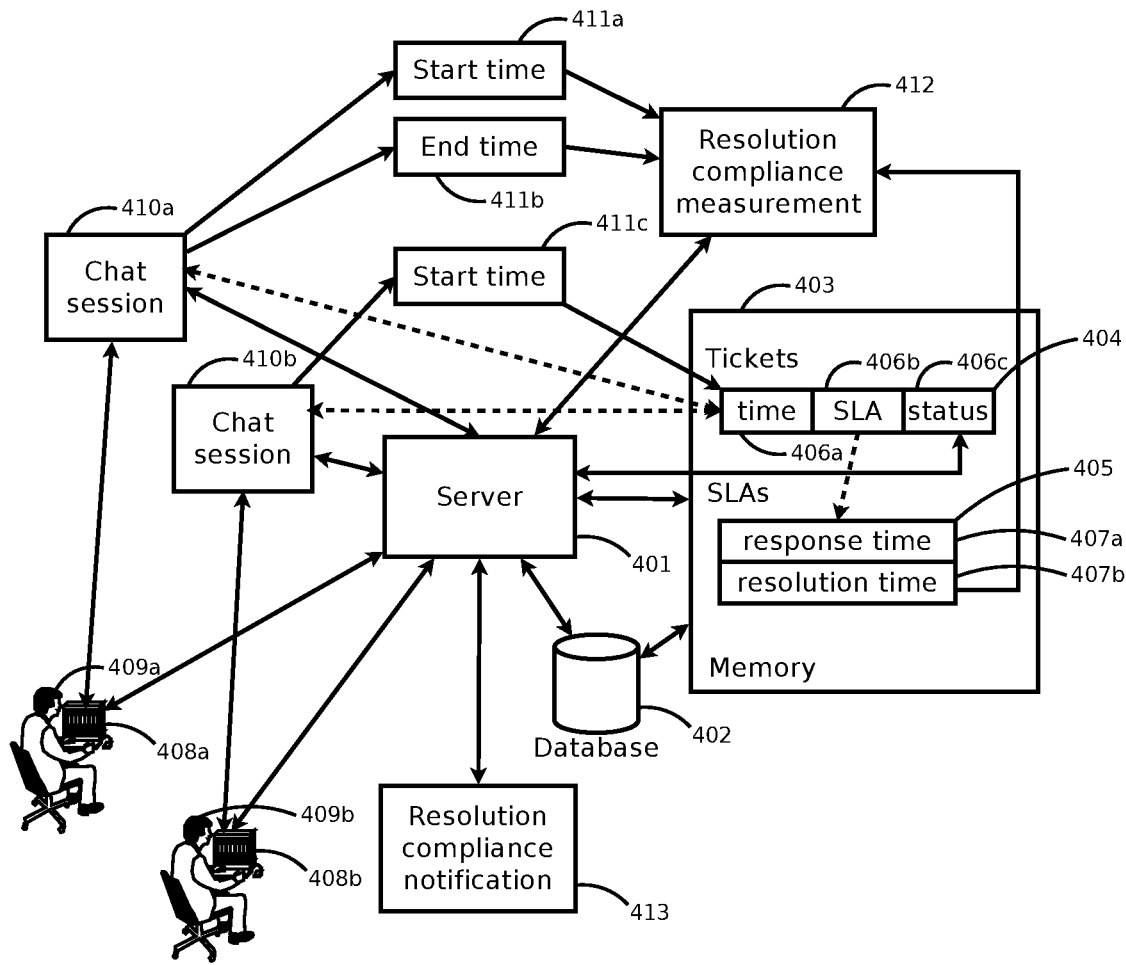
FIG. 4 is an illustrative block diagram of an embodiment of a system for managing service level agreement compliance of support tickets using chat sessions.

FIG. 4 is an illustrative block diagram of an embodiment of a system for managing service level agreement compliance of support tickets using chat sessions. The server 401 can access a database 402 and retrieve, into memory 403, a support ticket 404 and a service level agreement (SLA) 405. The support ticket 404 can include a creation time 406a, a reference 406b to an SLA, and a ticket status 406c. In the embodiment depicted in FIG. 4, the reference 406b is associated with the SLA 405. The SLA 405 can include a maximum response time 407a and a maximum resolution time 407b. A support agent 409a can use a computing device 408a to interact with the server 401 to start a chat session 410a. The chat session 410a can be associated with the support ticket 404. The chat session 410a can record a time stamp 411a when the support agent 409a creates the first chat comment. A compliance measurement 412 can compute the elapsed time between the creation time 406a of the support ticket 404 and the time stamp 411a of the first response of the support agent 409a, and compare it to the maximum response time 407a of the SLA 405. If the elapsed time is greater than the maximum response time 407a, the compliance measurement 412 can determine that the support ticket 404 is not in compliance with the SLA 405; otherwise the compliance measurement 412 can determine that the support ticket 404 is in compliance with the SLA 405. The compliance measurement 412 can transmit this determination to the server 401. The server 401 may generate a notification 413 about the SLA compliance, based on this determination.

In one embodiment, a computing device 408b can communicate with the server 401 to terminate the chat session 410a, or the support agent 409a may use the computing device 408a communicating with the server 401 to terminate the chat session 410a. The chat session 410a can record a time stamp 411b when the chat session 410a was terminated, indicating this time stamp 411b as the resolution time of the support ticket 404. The compliance measurement 412 can compute the elapsed time between the creation time 406a of the support ticket 404 and the time stamp 411b of the resolution of the support ticket 404, and compare it to the maximum resolution time 407b of the SLA 405. If the elapsed time is greater than the maximum resolution time 407b, the compliance measurement 412 can determine that the support ticket 404 is not in compliance with the SLA 405; otherwise the compliance measurement 412 can determine that the support ticket 404 is in compliance with the SLA 405. The compliance measurement 412 can transmit this determination to the server 401. The server 401 may generate a notification 413 about the SLA compliance, based on this determination.

In one embodiment, when the chat session 410a is terminated, the server 401 can update the status 406c of the support ticket 404 to indicate a "closed" status.

In one embodiment, after the status 406c of the support ticket 404 has been updated to indicate a closed status, a customer 409b can use a computing device 408b in communication with the server 401 to start a second chat session 410b associated with support ticket 404. The chat session 410b can record a time stamp 411c when the customer 409b creates the first chat comment. The server 401 can use this time stamp 411c to update the creation time 406a of the support ticket 404, and can update the status 406c of the support ticket 404 to indicate a "reopened" status. In this way the server 401 can prepare the support ticket 404 for SLA compliance management with regards to its use in a new support incident.

In one embodiment, the customer 409b can use the computing device 408b in communication with the server 401 to close the support ticket 404 by updating the ticket status 406c to a "closed" status, or the support agent 409a can use the computing device 408a in communication with the server 401 to close the support ticket 404 by updating the ticket status 406c to a "closed" status. The server 401 may terminate the chat session 410b as a result of closing the support ticket 404.

In some embodiments, the server 401 in FIG. 4 can include components or functionality of the server 101 as described with respect to FIG. 1. In some embodiments, the database 402 in FIG. 4 can include components or functionality of the database 102 as described with respect to FIG. 1. In some embodiments, the memory 403 in FIG. 4 can include components or functionality of the memory 103 as described with respect to FIG. 1. In some embodiments, the support ticket 404 in FIG. 4 can include components or functionality of the support ticket 104 as described with respect to FIG. 1. In some embodiments, the service level agreement 405 in FIG. 4 can include components or functionality of the service level agreement 105 as described with respect to FIG. 1. In some embodiments, the computing devices 408a-b in FIG. 4 can include components or functionality of the computing device 108 as described with respect to FIG. 1. In some embodiments, the users 409a-b in FIG. 4 can include components or functionality of the support agent 109 as described with respect to FIG. 1. In some embodiments, the chat sessions 410a-b in FIG. 4 can include components or functionality of the chat session 110 as described with respect to FIG. 1. In some embodiments, the time stamps 411a-c in FIG. 4 can include components or functionality of the time stamp 111 as described with respect to FIG. 1. In some embodiments, the compliance measurement 412 in FIG. 4 can include components or functionality of the compliance measurement 112 as described with respect to FIG. 1. In some embodiments, the compliance notification 413 in FIG. 4 can include components or functionality of the compliance notification 113 as described with respect to FIG. 1.

Figure 5:
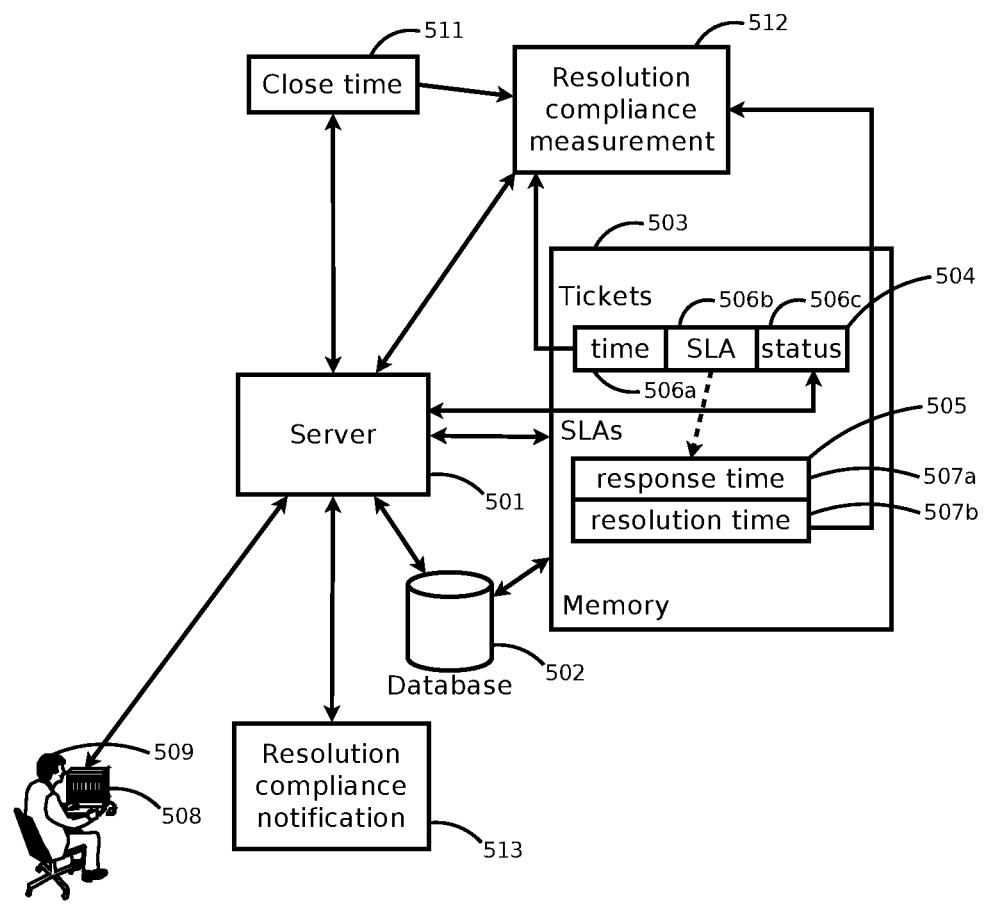
FIG. 5 is an illustrative block diagram of an embodiment of a system for managing service level agreement compliance of a support ticket while closing the support ticket.

FIG. 5 is an illustrative block diagram of an embodiment of a system for managing service level agreement compliance of a support ticket while closing the support ticket. The server 501 can access a database 502 and retrieve, into memory 503, a support ticket 504 and a service level agreement (SLA) 505. The support ticket 504 can include a creation time 506a, a reference 506b to an SLA, and a ticket status 506c. In the embodiment depicted in FIG. 5, the reference 506b is associated with the SLA 505. The SLA 505 can include a maximum response time 507a and a maximum resolution time 507b. A user 509, who may be a support agent or a customer, can use a computing device 508 in communication with the server 501 to close the support ticket 504 by updating the ticket status 506c to a "closed" status. The server 501 can record the time stamp 511 of this status update, indicating this time stamp 511 as the resolution time of the support ticket 504. The compliance measurement 512 can compute the elapsed time between the creation time 506a of the support ticket 504 and the time stamp 511 of the resolution of the support ticket 504, and compare it to the maximum resolution time 507b of the SLA 505. If the elapsed time is greater than the maximum resolution time 507b, the compliance measurement 512 can determine that the support ticket 504 is not in compliance with the SLA 505; otherwise the compliance measurement 512 can determine that the support ticket 504 is in compliance with the SLA 505. The compliance measurement 512 can transmit this determination to the server 501. The server 501 may generate a notification 513 about the SLA compliance, based on this determination.

In some embodiments, the server 501 in FIG. 5 can include components or functionality of the server 101 as described with respect to FIG. 1. In some embodiments, the database 502 in FIG. 5 can include components or functionality of the database 102 as described with respect to FIG. 1. In some embodiments, the memory 503 in FIG. 5 can include components or functionality of the memory 103 as described with respect to FIG. 1. In some embodiments, the support ticket 504 in FIG. 5 can include components or functionality of the support ticket 104 as described with respect to FIG. 1. In some embodiments, the service level agreement 505 in FIG. 5 can include components or functionality of the service level agreement 105 as described with respect to FIG. 1. In some embodiments, the computing device 508 in FIG. 5 can include components or functionality of the computing device 108 as described with respect to FIG. 1. In some embodiments, the user 509 in FIG. 5 can include components or functionality of the support agent 109 as described with respect to FIG. 1. In some embodiments, the time stamp 511 in FIG. 5 can include components or functionality of the time stamp 111 as described with respect to FIG. 1. In some embodiments, the compliance measurement 512 in FIG. 5 can include components or functionality of the compliance measurement 112 as described with respect to FIG. 1. In some embodiments, the compliance notification 513 in FIG. 5 can include components or functionality of the compliance notification 113 as described with respect to FIG. 1.

Figure 6:
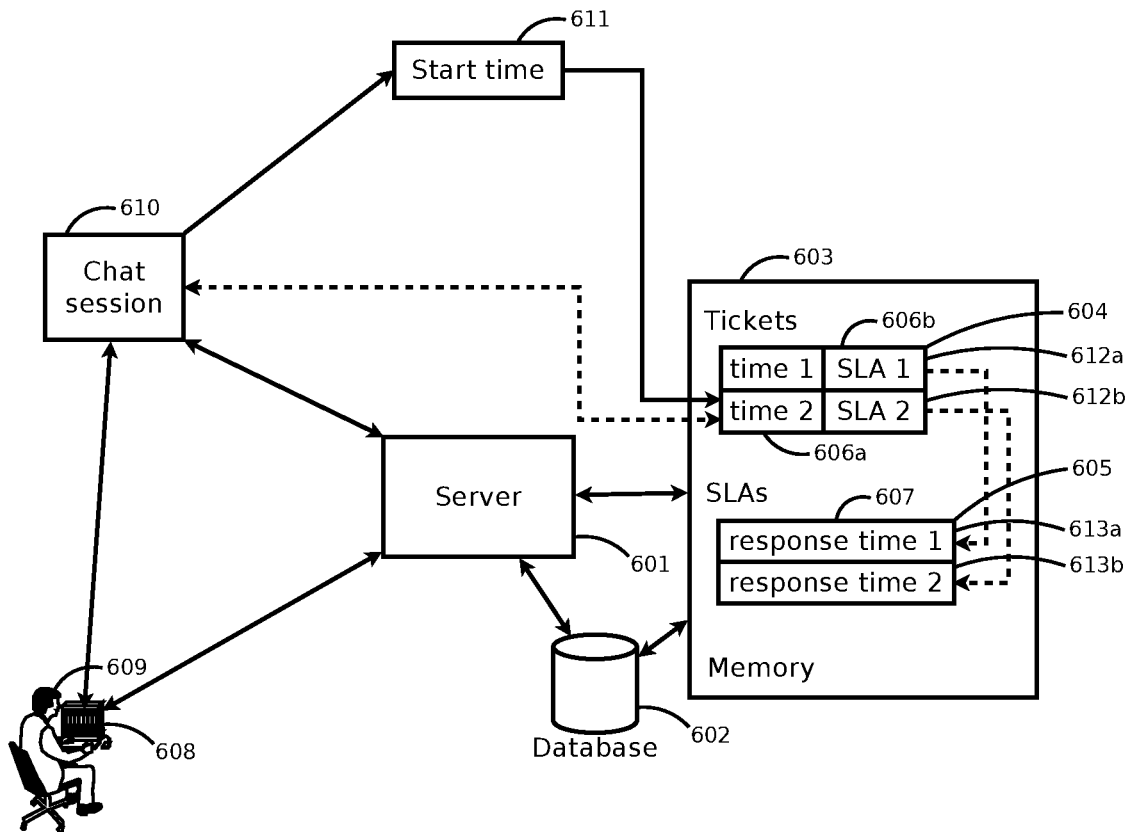
FIG. 6 is an illustrative block diagram of an embodiment of a system for managing the service level agreement of a support ticket while creating the support ticket using a chat session.

FIG. 6 is an illustrative block diagram of an embodiment of a system for managing the service level agreement of a support ticket while creating the support ticket using a chat session. The server 601 can access a database 602 and retrieve, into memory 603, a list 604 of support tickets 612a, 612b, and so on, and a list 605 of service level agreements (SLAs) 613a, 613b, and so on. Each support ticket 612a, 612b, and so on in the list 604 can include a creation time 606a and a reference 606b to an SLA. In the embodiment depicted in FIG. 6, the reference 606b for support ticket 612a is associated with the SLA 613a, and the reference 606b for support ticket 612b is associated with the SLA 613b. Each SLA 613a, 613b, and so on in the list 605 can include a maximum response time 607.

In one embodiment, the support ticket 612b does not exist when the server 601 initially accesses the database 602. A customer 609 can use a computing device 608 in communication with the server 601 to start a chat session 610 concerning a support issue. The server 601 can create a new support ticket 612b and associate it with the chat session 610. The chat session 610 can record a time stamp 611 when the customer 609 creates the first chat comment. The server 601 can use the time stamp 611 to set the creation time 606a of the new support ticket 612b.

In some embodiments, the server 601 in FIG. 6 can include components or functionality of the server 101 as described with respect to FIG. 1. In some embodiments, the database 602 in FIG. 6 can include components or functionality of the database 102 as described with respect to FIG. 1. In some embodiments, the memory 603 in FIG. 6 can include components or functionality of the memory 103 as described with respect to FIG. 1. In some embodiments, each support ticket 612a, 612b, and so on in the list 604 in FIG. 6 can include components or functionality of the support ticket 104 as described with respect to FIG. 1. In some embodiments, each service level agreement 613a, 613b, and so on in the list 605 in FIG. 6 can include components or functionality of the service level agreement 105 as described with respect to FIG. 1. In some embodiments, the computing device 608 in FIG. 6 can include components or functionality of the computing device 108 as described with respect to FIG. 1. In some embodiments, the customer 609 in FIG. 6 can include components or functionality of the support agent 109 as described with respect to FIG. 1. In some embodiments, the chat session 610 in FIG. 6 can include components or functionality of the chat session 110 as described with respect to FIG. 1. In some embodiments, the time stamp 611 in FIG. 6 can include components or functionality of the time stamp 111 as described with respect to FIG. 1.

Figure 7:
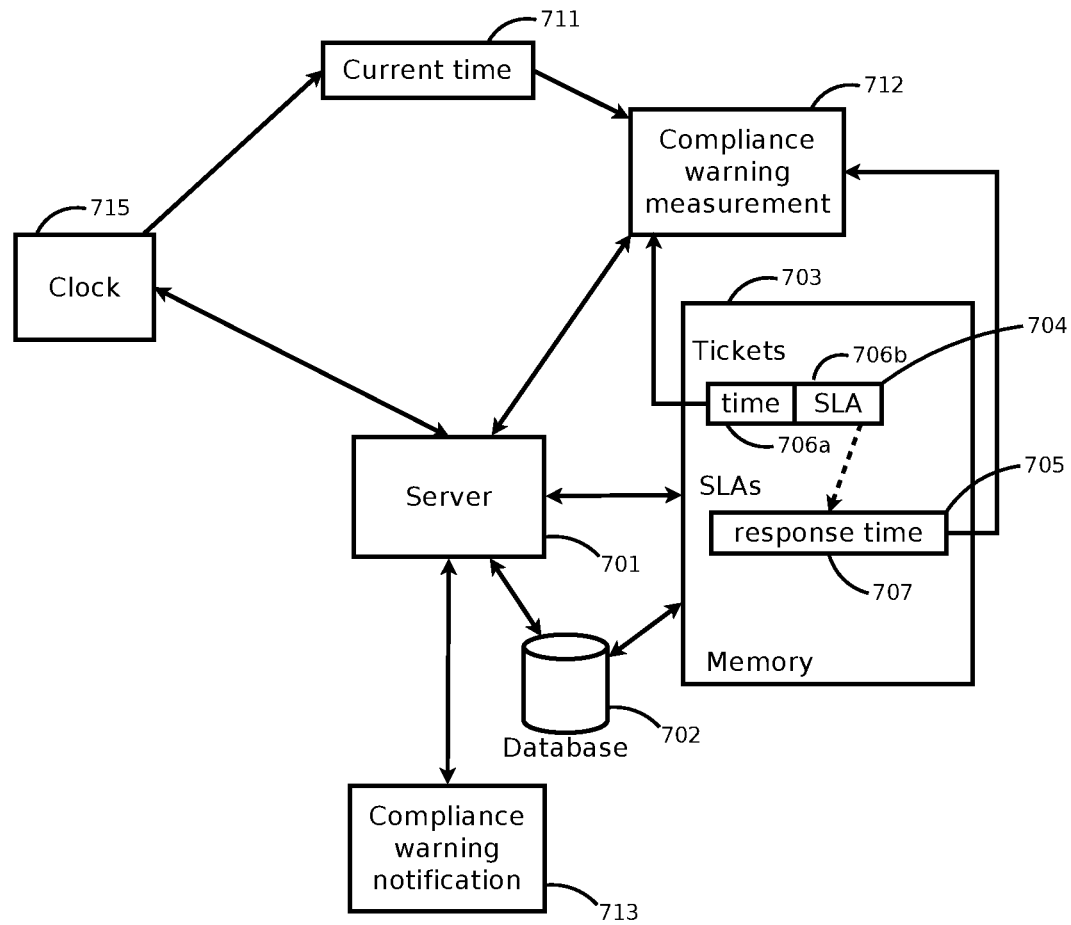
FIG. 7 is an illustrative block diagram of an embodiment of a system for warning service level agreement compliance issues of a support ticket.

FIG. 7 is an illustrative block diagram of an embodiment of a system for warning service level agreement compliance issues of a support ticket. The server 701 can access a database 702 and retrieve, into memory 703, a support ticket 704 and a service level agreement (SLA) 705. The support ticket 704 can include a creation time 706a and a reference 706b to an SLA. In the embodiment depicted in FIG. 7, the reference 706b is associated with the SLA 705. The SLA 705 can include a maximum response time 707. The server can retrieve a time stamp 711 representing the current time from a clock 715. A compliance measurement 712 can compute the elapsed time between the creation time 706a of the support ticket 704 and the time stamp 711 of the current time, and compare it to the maximum response time 707 of the SLA 705. If the elapsed time is greater than a value that is either the maximum response time 707 minus a threshold, or a value that is a percentage of the maximum response time 707, then the compliance measurement 712 can determine that the support ticket 704 may be in danger of becoming non-compliant with the SLA 705; otherwise the compliance measurement 712 can determine that the support ticket 704 is not in danger of becoming non-compliant with the SLA 705. The compliance measurement 712 can transmit this determination to the server 701. The server 701 may generate a warning notification 713 about the SLA compliance, based on this determination.

In some embodiments, the server 701 in FIG. 7 can include components or functionality of the server 101 as described with respect to FIG. 1. In some embodiments, the database 702 in FIG. 7 can include components or functionality of the database 102 as described with respect to FIG. 1. In some embodiments, the memory 703 in FIG. 7 can include components or functionality of the memory 103 as described with respect to FIG. 1. In some embodiments, the support ticket 704 in FIG. 7 can include components or functionality of the support ticket 104 as described with respect to FIG. 1. In some embodiments, the service level agreement 705 in FIG. 7 can include components or functionality of the service level agreement 105 as described with respect to FIG. 1. In some embodiments, the time stamp 711 in FIG. 7 can include components or functionality of the time stamp 111 as described with respect to FIG. 1. In some embodiments, the compliance measurement 712 in FIG. 7 can include components or functionality of the compliance measurement 112 as described with respect to FIG. 1. In some embodiments, the compliance notification 713 in FIG. 7 can include components or functionality of the compliance notification 113 as described with respect to FIG. 1.

Figure 8:
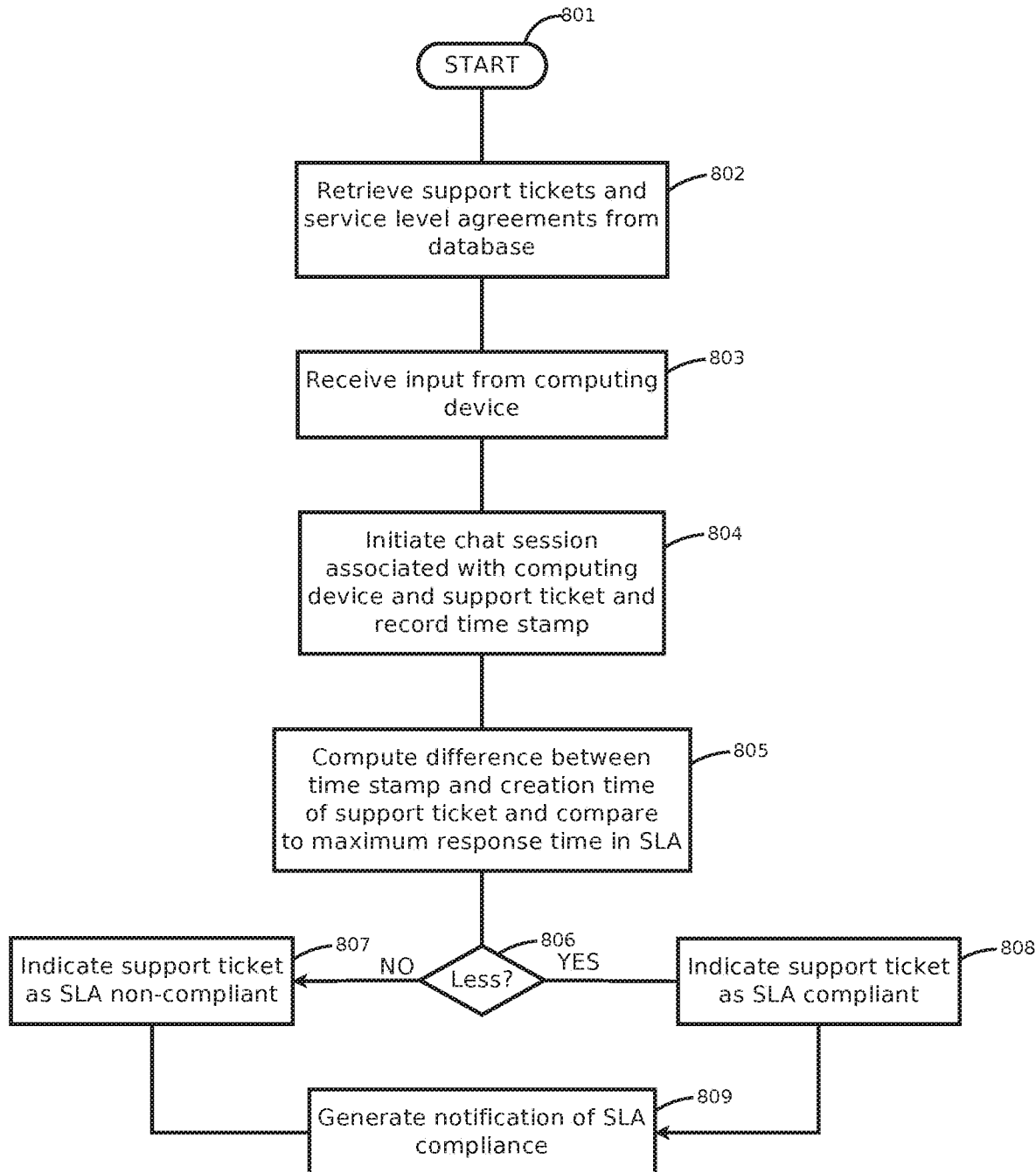
FIG. 8 is an illustrative flowchart depicting one embodiment of a method of managing information technology service level agreements via a computer network.

FIG. 8 is an illustrative flowchart depicting one embodiment of a method of managing information technology service level agreements via a computer network. The method 801 can include accessing, by a server, a database storing, in memory, a support ticket comprising a creation time and service level agreement, the service level agreement comprising a maximum response time (802). The method 801 can include receiving input from a computing device (803). The method 801 can include initiating, by the server via the computer network, responsive to input from a computing device, a chat session associated with the computing device and the support ticket, the initiating associated with a time stamp (804). The method 801 can include computing a compliance computed as the difference between the time stamp and the creation time, and comparing the result to see if it is less than the maximum response time in the SLA (805). The method 801 can include checking whether the comparison was less (806). In some embodiments, the method 801 can include indicating that the support ticket is non-compliant with the SLA (807). In some embodiments, the method 801 can include indicating that the support ticket is compliant with the SLA (808). The method 801 can include generating, by the server, a notification of the compliance with the service level agreement (809).

Figure 9:
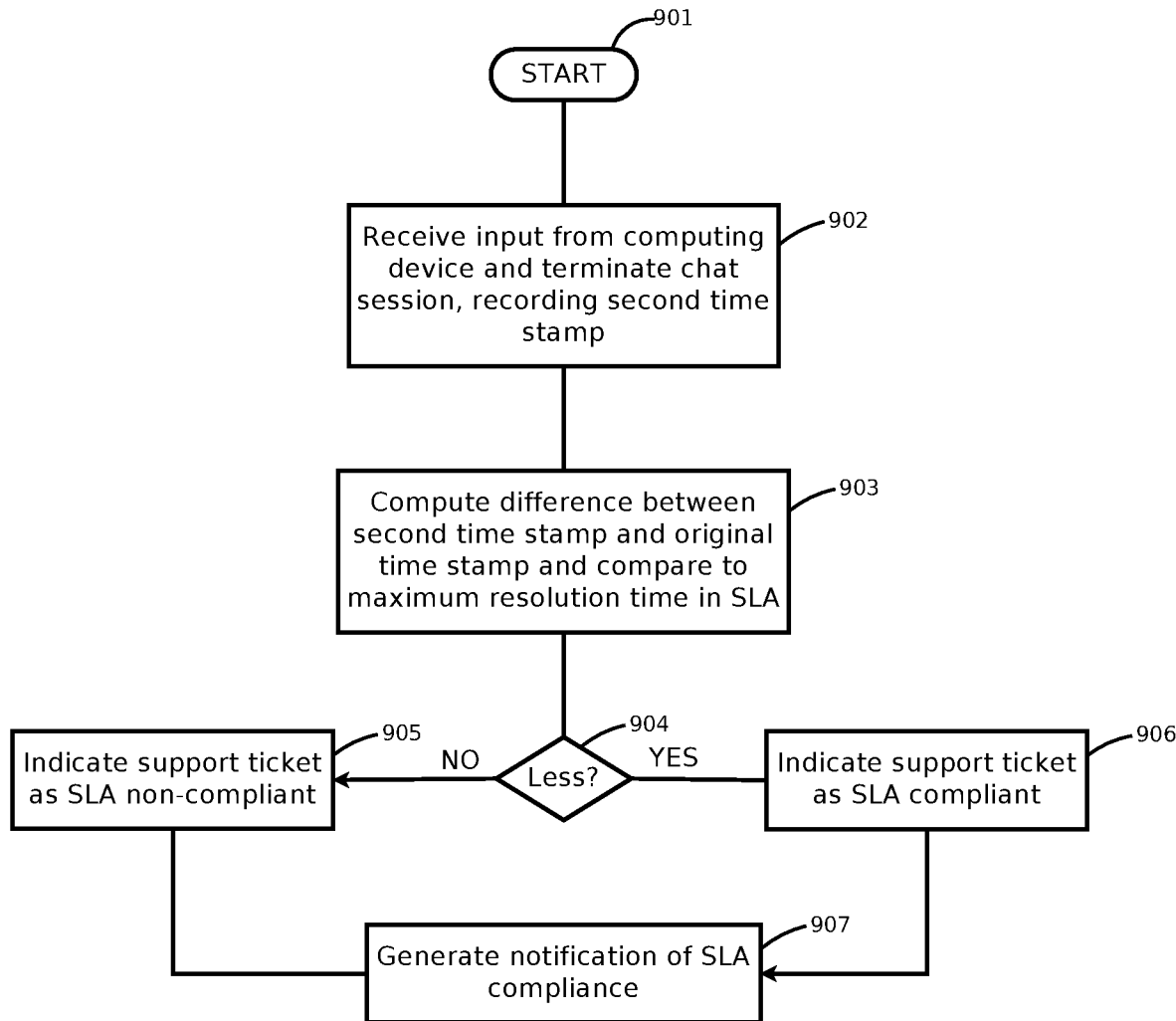
FIG. 9 is an illustrative flowchart depicting one embodiment of a method of checking service level agreement compliance as a result of terminating a chat session.

FIG. 9 is an illustrative flowchart depicting one embodiment of a method of checking service level agreement compliance as a result of terminating a chat session. The method 901 can include terminating, by the server via the computer network, responsive to input from a second computing device, the chat session, the terminating associated with a second time stamp (902). The method 901 can include computing a compliance computed as the difference between the second time stamp and the time stamp, and comparing the result to see if it is less than the maximum resolution time in the SLA (903). The method 901 can include checking whether the comparison was less (904). In some embodiments, the method 901 can include indicating that the support ticket is non-compliant with the SLA (905). In some embodiments, the method 901 can include indicating that the support ticket is compliant with the SLA (906). The method 901 can include generating, by the server, a notification of the compliance with the service level agreement (907).

Figure 10:
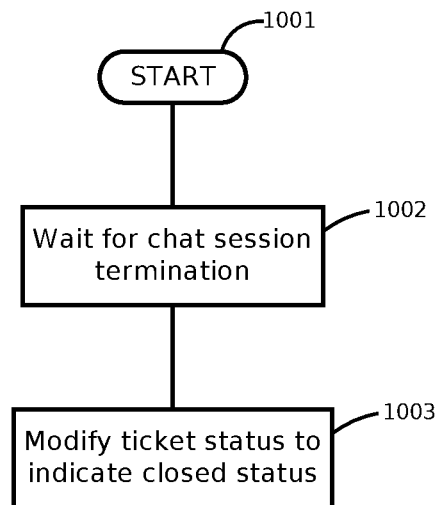
FIG. 10 is an illustrative flowchart depicting one embodiment of a method of closing a support ticket and checking service level agreement compliance as a result of terminating a chat session.

FIG. 10 is an illustrative flowchart depicting one embodiment of a method of closing a support ticket and checking service level agreement compliance as a result of terminating a chat session. The method 1001 can include waiting for the chat session to terminate (1002). The method 1001 can include modifying, by the server, responsive to the terminating, the status to indicate a closed status (1003).

Figure 11:
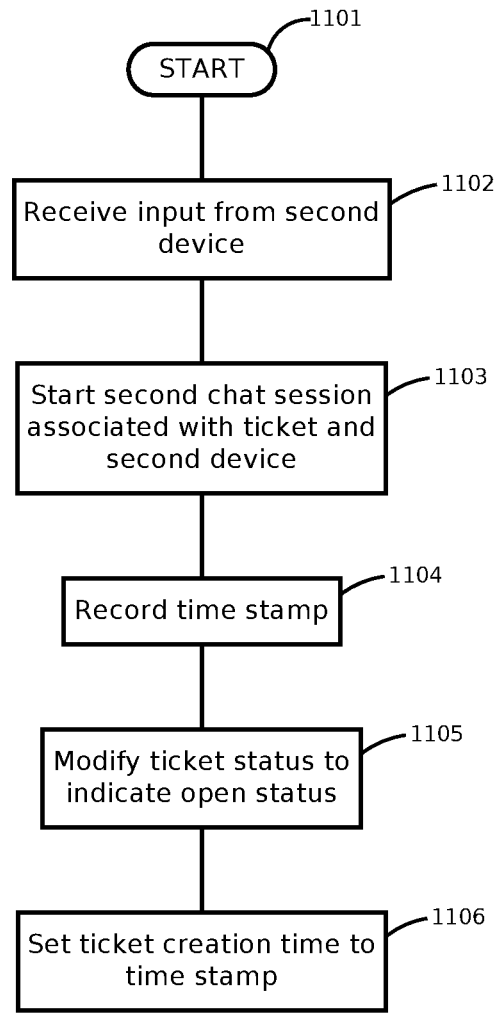
FIG. 11 is an illustrative flowchart depicting one embodiment of a method of reopening an existing support ticket with a chat session.

FIG. 11 is an illustrative flowchart depicting one embodiment of a method of reopening an existing support ticket with a chat session. The method 1101 can include receiving input from a second computing device (1102). The method 1101 can include initiating, by the server via the computer network, responsive to input from a second computing device, a second chat session associated with the second computing device and the support ticket (1103). The method 1101 can include recording a second time stamp (1104). The method 1101 can include modifying, by the server, responsive to the initiating of the second chat session, the status to indicate an open status (1105). The method 1101 can include modifying, by the server, responsive to the initiating of the second chat session, the creation time to be the second time stamp (1106).

Figure 12:
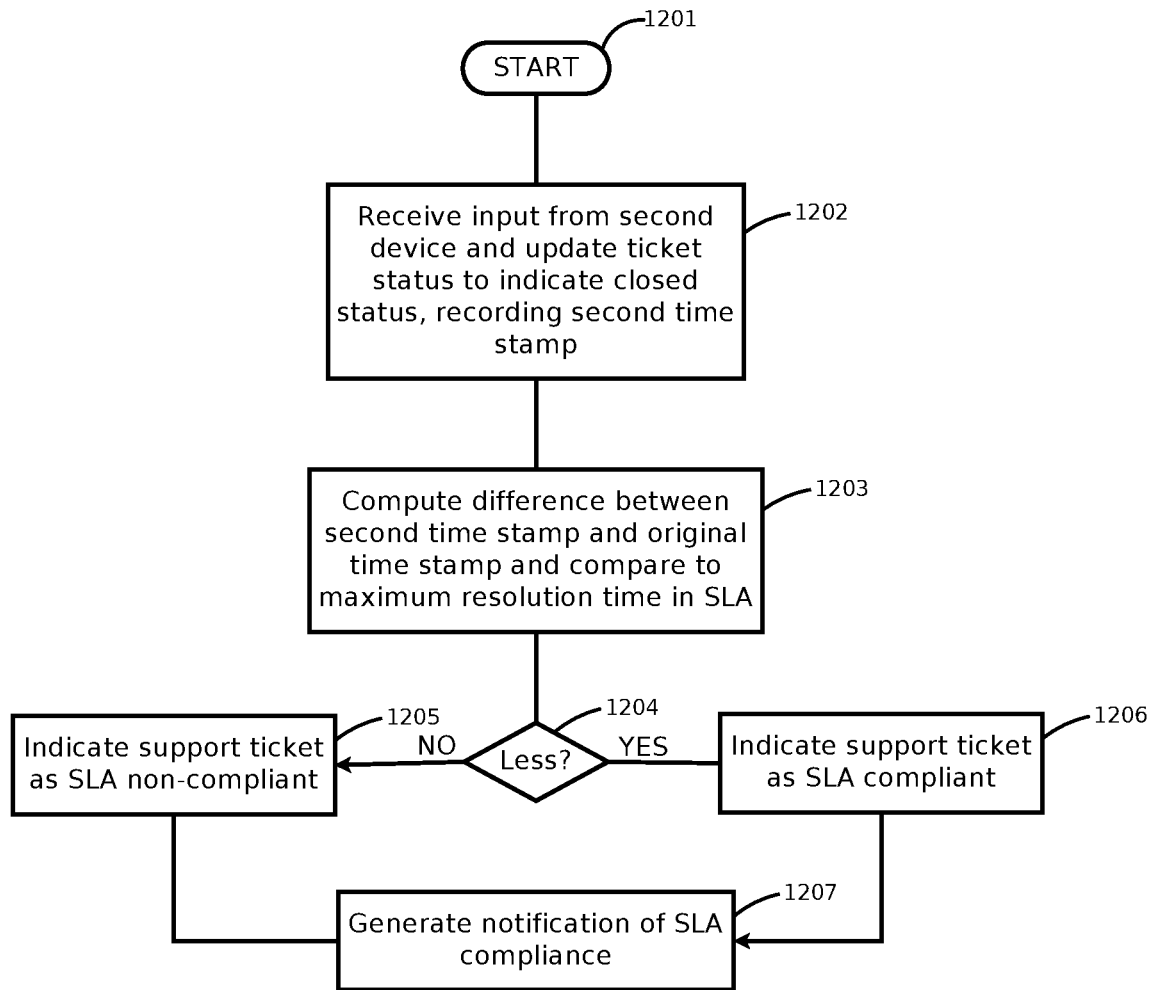
FIG. 12 is an illustrative flowchart depicting one embodiment of a method of checking service level agreement compliance as a result of closing a support ticket.

FIG. 12 is an illustrative flowchart depicting one embodiment of a method of checking service level agreement compliance as a result of closing a support ticket. The method 1201 can include modifying, by the server, responsive to input from a second computing device, the status to indicate a closed status, the modifying associated with a second time stamp (1202). The method 1201 can include computing a compliance computed as the difference between the second time stamp and the time stamp, and comparing the result to see if it is less than the maximum resolution time in the SLA (1203). The method 1201 can include checking whether the comparison was less (1204). In some embodiments, the method 1201 can include indicating that the support ticket is non-compliant with the SLA (1205). In some embodiments, the method 1201 can include indicating that the support ticket is compliant with the SLA (1206). The method 1201 can include generating, by the server, a notification of the compliance with the service level agreement (1207).

Figure 13:
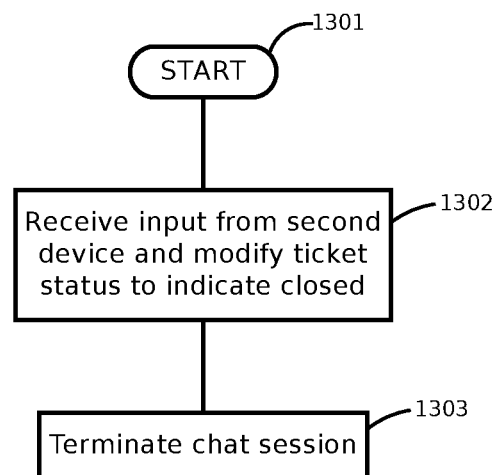
FIG. 13 is an illustrative flowchart depicting one embodiment of a method of terminating a chat session as a result of closing a support ticket.

FIG. 13 is an illustrative flowchart depicting one embodiment of a method of terminating a chat session as a result of closing a support ticket. The method 1301 can include modifying, by the server, responsive to input from a second computing device, the status to indicate a closed status (1302). The method 1301 can include terminating, by the server via the computer network, responsive to the modifying, the chat session (1303).

Figure 14:
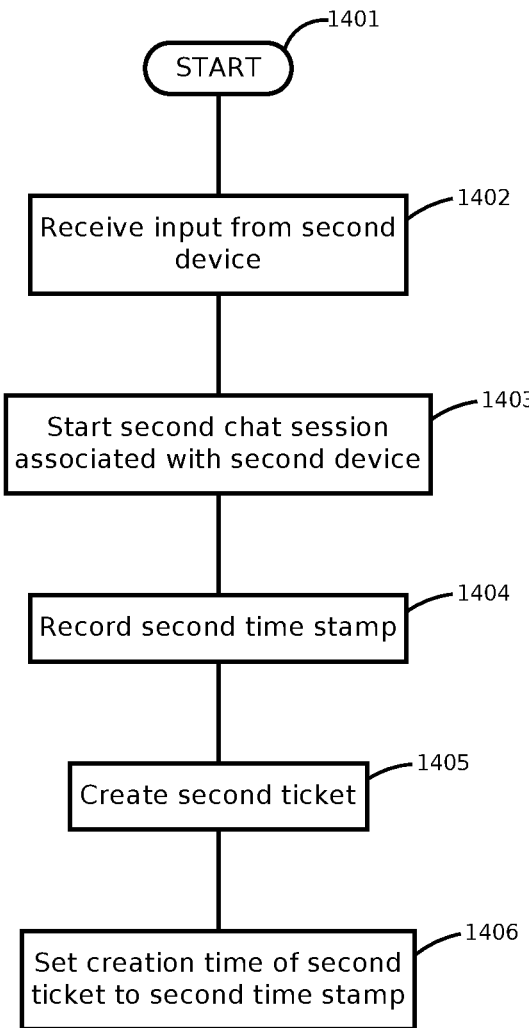
FIG. 14 is an illustrative flowchart depicting one embodiment of a method of creating a new support ticket with a chat session.

FIG. 14 is an illustrative flowchart depicting one embodiment of a method of creating a new support ticket with a chat session. The method 1401 can include receiving input from a second computing device (1402). The method 1401 can include initiating, by the server via the computer network, responsive to input from the second computing device, a second chat session associated with the second computing device (1403). The method 1401 can include recording a second time stamp (1404). The method 1401 can include creating a second support ticket (1405). The method 1401 can include setting the creation time of the second support ticket to be the time indicated by the second time stamp (1406).

Figure 15:
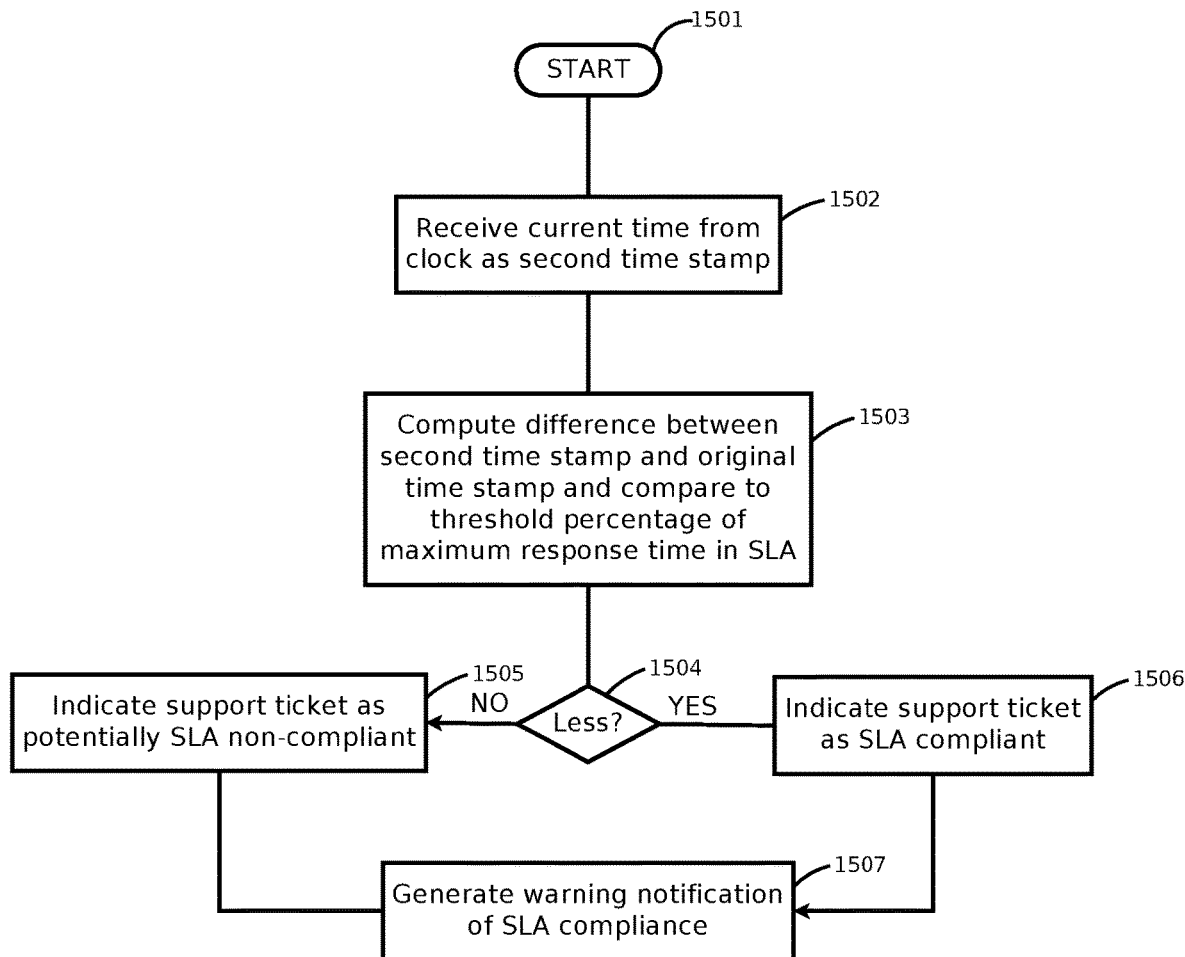
FIG. 15 is an illustrative flowchart depicting one embodiment of a method of warning about potential service level agreement compliance issues.

FIG. 15 is an illustrative flowchart depicting one embodiment of a method of warning about potential service level agreement compliance issues. The method 1501 can include receiving, by the server from a clock, a current time as a second time stamp (1502). The method 1501 can include computing a compliance computed as the difference between the second time stamp and the time stamp, and comparing the result to see if it is less than the maximum response time in the SLA (1503). The method 1501 can include checking whether the comparison was less (1504). In some embodiments, the method 1501 can include indicating that the support ticket is non-compliant with the SLA (1505). In some embodiments, the method 1501 can include indicating that the support ticket is compliant with the SLA (1506). The method 1501 can include generating, by the server, a warning notification of the possible compliance issue with the service level agreement (1507).

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of managing information technology service level agreements via a computer network, comprising:
    accessing, by a server, a database storing, in memory, a support ticket comprising a creation time and service level agreement, the service level agreement comprising a maximum response time;
    initiating, by the server via the computer network, responsive to input from a computing device, a chat session associated with the computing device and the support ticket, the initiating associated with a time stamp;
    determining, by the server, a compliance with the service level agreement, the compliance computed as a difference between the time stamp and the creation time being less than the maximum response time;
    generating, by the server, a notification of the compliance with the service level agreement;
    initiating, by the server via the computer network, responsive to second input from a second computing device, a second chat session associated with the second computing device, the second initiating associated with a second time stamp; and
    creating, by the server, a second support ticket comprising a second creation time, the second creation time equal to the second time stamp.

2. The method of claim 1, wherein the service level agreement further comprises a maximum resolution time, further comprising:
    terminating, by the server via the computer network, responsive to third input from a third computing device, the chat session, the terminating associated with a third time stamp;
    determining, by the server, a second compliance with the service level agreement, the second compliance computed as the difference between the third time stamp and the time stamp being less than the maximum resolution time; and
    generating, by the server, a second notification of the second compliance with the service level agreement.

3. The method of claim 2, wherein the support ticket further comprises a status, further comprising:
    modifying, by the server, responsive to the terminating, the status to indicate a closed status.

4. The method of claim 1, further comprising:
    modifying, by the server, responsive to the second initiating of the second chat session, a status of the second support ticket to indicate an open status.

5. The method of claim 1, wherein the service level agreement further comprises a maximum resolution time and the support ticket further comprising a status, the method further comprising:
    modifying, by the server, responsive to third input from a third computing device, the status to indicate a closed status, the modifying associated with a third time stamp;
    determining, by the server, a second compliance with the service level agreement, the second compliance computed as the difference between the third time stamp and the time stamp being less than the maximum resolution time; and
    generating, by the server, a second notification of the second compliance with the service level agreement.

6. The method of claim 1, wherein the support ticket further comprises a status, further comprising:
    modifying, by the server, responsive to third input from a third computing device, the status to indicate a closed status; and
    terminating, by the server via the computer network, responsive to the modifying, the chat session.

7. The method of claim 1, further comprising:
    receiving, by the server from a clock, a current time as a third time stamp;
    determining, by the server, a warning of the service level agreement, the warning computed as the difference between the third time stamp and the creation time being more than a threshold percentage of the maximum response time; and
    generating, by the server, a second notification of the warning of the service level agreement.

8. A system for managing information technology service level agreements via a computer network, comprising:
    a server including a processor and memory configured to:
        access a database storing a support ticket comprising a creation time and service level agreement, the service level agreement comprising a maximum response time;
        initiate, via the computer network, responsive to input from a computing device, a chat session associated with the computing device and the support ticket, the initiating associated with a time stamp;

determine a compliance with the service level agreement, the compliance computed as a difference between the time stamp and the creation time being less than the maximum response time;

generate a notification of the compliance with the service level agreement;

initiate, via the computer network, responsive to input from a second computing device, a second chat session associated with the second computing device, the second initiating associated with a second time stamp; and create a second support ticket comprising a second creation time, the second creation time equal to the second time stamp.

9. The system of claim 8, wherein:

the service level agreement further comprises a maximum resolution time; and the server is further configured to:

terminate, via the computer network, responsive to third input from a third computing device, the chat session, the terminating associated with a third time stamp;

determine a second compliance with the service level agreement, the second compliance computed as the difference between the third time stamp and the time stamp being less than the maximum resolution time; and generate a second notification of the second compliance with the service level agreement.

10. The system of claim 9, wherein:

the support ticket further comprises a status; and the server is further configured to:

modify responsive to the terminating, the status to indicate a closed status.

11. The system of claim 10, wherein the server is further configured to:

modify, responsive to the second initiating of the second chat session, a second status to indicate an open status.

12. The system of claim 8, wherein:

the service level agreement further comprises a maximum resolution time;

the support ticket further comprises a status; and the server is further configured to:

modify, responsive to third input from a third computing device, the status to indicate a closed status, the modifying associated with a third time stamp;

determine a second compliance with the service level agreement, the second compliance computed as the difference between the third time stamp and the time stamp being less than the maximum resolution time; and generate a second notification of the second compliance with the service level agreement.

13. The system of claim 8, wherein:

the support ticket further comprises a status; and the server is further configured to:

modify, responsive to third input from a third computing device, the status to indicate a closed status; and terminate, via the computer network, responsive to the modifying, the chat session.

14. The system of claim 8, wherein the server is further configured to:

receive, from a clock, a current time as a third time stamp;

determine a warning of the service level agreement, the warning computed as the difference between the third time stamp and the creation time being more than a threshold percentage of the maximum response time; and generate a second notification of the warning of the service level agreement.

* * * * *